July 20, 1937.  F. C. STANLEY  2,087,488
FRICTION CLUTCH
Filed July 24, 1935
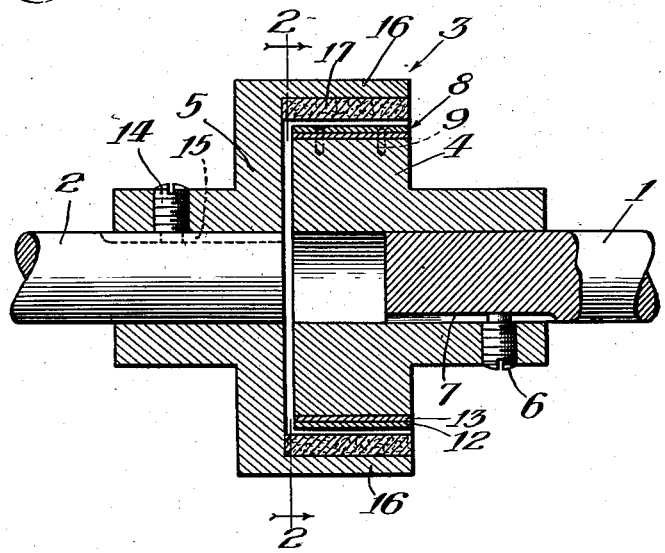
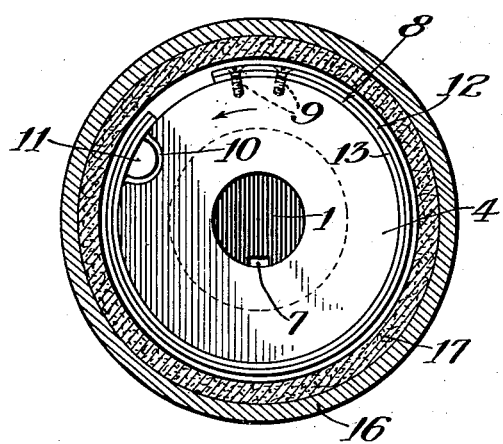
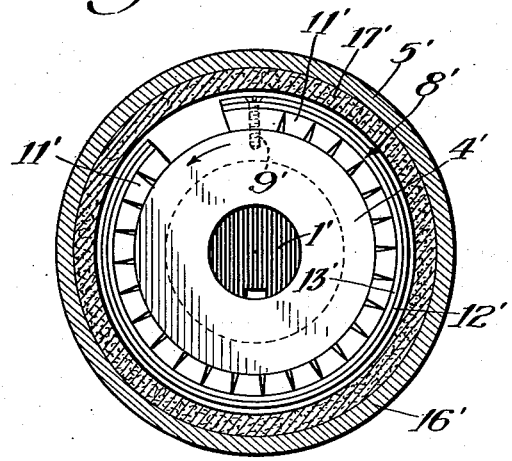
Inventor:
Frederick C. Stanley,
By: Lee J. Gary
Attorney.

Patented July 20, 1937

2,087,488

UNITED STATES PATENT OFFICE 2,087,488

FRICTION CLUTCH

Frederick C. Stanley, Bridgeport, Conn., assignor to Raybestos-Manhattan, Inc., Bridgeport, Conn., a corporation of New Jersey Application July 24, 1935, Serial No. 32,875

5 Claims. (Cl. 192—105)

This invention relates to improvements in a combination thermal-centrifugal clutch, and refers specifically to a clutch which makes and maintains substantially non-slipping engagement at a predetermined speed to drive a predetermined load, thermal means being provided to permit the prime mover or driver to gradually assume the load.

The utility, objects and advantages of my invention will be apparent from the accompanying drawing and following detail description.

In the drawing, Fig. 1 is a longitudinal sectional view of a preferred form of my clutch.

Fig. 2 is a transverse sectional view taken on line 2—2 of Fig. 1.

Fig. 3 is a similar view of a slight modification of my invention.

Referring in detail to the drawing, 1 indicates a driving shaft which may comprise the shaft of an electric motor or a shaft driven by any type prime mover (not shown). Shaft 1 may be disposed in end abutting relationship with a driven shaft 2 which may be operatively connected to a load (not shown) which is adapted to be driven at a predetermined speed. A clutch 3 comprising a driving member 4 and a driven member 5 is adapted to operatively connect shafts 1 and 2.

The driving member 4 of clutch 3 may comprise a flanged collar which may be rigidly mounted upon shaft 1 by means of set-screw 6 which may engage in the key-way 7 provided in said shaft. The periphery of the flanged portion of collar 4 may be circular and a bi-metal band 8 may be secured at one end to said peripheral surface by means of screws 9 or the like. Band 8 may embrace the circular flange and may be free at its opposite end. A recess 10 may be provided in the flange adjacent the free end of band 8 and is adapted to receive weight 11 which is carried on the inner surface of said band.

Band 8 may be constructed of two strips of different metal, said strips being rigidly secured together. The construction and function of band 8 is such that when heated it will tend to increase its radius of curvature, in other words, it will tend to straighten. To accomplish this result, the outer strip 12 is formed of a material having a lower coefficient of expansion than the inner strip 13.

The coacting member 5 of clutch 3 may be rigidly secured to shaft 2 by means of set-screw 14 which engages in key-way 15. Member 5 may have an outwardly extending annular flange 16 which is adapted to embrace the flange of member 4. A friction material or lining 17 may be mounted on the inner periphery of flange 16 and, during engagement is adapted to contact band 8.

In operation, when shaft 1 is initially rotated, band 8, due to centrifugal force, moves outwardly into contact with lining 17. However, the load being initially stationary resists said movement, causing a frictional drag to be developed between the bi-metal band 12 and facing 17. This frictional drag is increased both by the thermal expansion of the bi-metal band and the increased pressure due to centrifugal action with increasing speed, and when the predetermined speed is reached the centrifugal pressure alone is sufficient to maintain substantially non-slipping engagement. When the driver ceases to rotate the clutch automatically disengages. Any unusual drag on the motor which might decrease its speed would release the centrifugally controlled engagement and then the phase of initial engagement is repeated.

The well known law of sliding friction correlates the normal pressure, the force parallel to the plane of friction and the coefficient of friction of the contacting surfaces. Moreover, centrifugal force is dependent upon weight and speed of rotation, correlated with the radius at which said weight is rotated. Therefore, assuming a constant predetermined coefficient of friction, the weight 11 which when rotated at a predetermined angular velocity will supply sufficient normal pressure to drive a predetermined load without slippage can readily be calculated. In addition, by combining the centrifugal action of weight 11 with the thermal action of band 8, the load can be accelerated to normal speed at a maximum rate.

Referring particularly to Fig. 3, a modification of my invention is shown. In this form of my invention, 1' indicates the driving shaft upon which clutch member 4' is mounted. The shaft 1' and clutch member 4' may be engaged with a load to be driven by means of a coacting clutch member 5', having a lining 17' similar to clutch member 5 and lining 17, respectively. One end of a bi-metal band 8' may be secured to the periphery of the clutch member 4' by means of screw 9' or the like, the opposite end of said band being free. Band 8' may comprise metal strips 12' and 13', being the outer and inner strip respectively, strip 12' having a lower coefficient of expansion than strip 13'.

In this form of my invention a series of weights

11' may be mounted upon the inner periphery of band 8', said weights being uniformly distributed throughout the length of said band. In this construction the centrifugal force is uniformly distributed throughout the length of band 8' and a more uniform normal pressure is obtained throughout the contacting areas of the band 8' and lining 17'.

In operation, this form of clutch functions similar to clutch 3, there being a gradually increasing normal pressure produced during acceleration of the load due to weights 11' and the thermal action of band 8', and when full speed is reached the centrifugal force of weights 11' supply the entire normal force and no slippage occurring.

It can readily be seen that a predetermined load may be accelerated gradually by the simultaneous action of centrifugal and thermal forces. This, of course, permits of a reduction in capacity of the motor or other prime mover to drive a predetermined load, in addition to permitting of the use of smaller clutch elements, shafting, etc. Further, due to the fact that at full load and full speed substantially no slippage occurs, wear upon the friction elements is reduced to a minimum and longer life of the clutch results.

I claim as my invention:

1. A friction clutch including driving and driven elements, and centrifugal and thermal means carried by said driving element for engaging a cooperating surface of the driven element, said centrifugal means acting solely to maintain said elements in driving engagement when said driven element has been accelerated to a predetermined speed.

2. A friction clutch comprising driving and driven elements, a bi-metal element carried by the driving element, a weight carried by said bi-metal element which by centrifugal force exerts normal pressure between said bi-metal element and driven element, said bi-metal element being expandible by heat and said weight acting solely to produce the entire normal pressure when the driven element reaches a predetermined speed.

3. A friction clutch comprising driving and driven elements, said driving element including a bi-metal element, a weight carried by said bi-metal element which by centrifugal force exerts normal pressure between said bi-metal element and driven element, said bi-metal element being expandible by heat, the thermal force caused by expansion of said bi-metal element and said centrifugal force simultaneously acting to produce normal engaging pressure during acceleration of said driven element and said centrifugal force acting solely to produce normal engaging pressure when said driven element reaches a predetermined speed.

4. A friction clutch comprising driving and driven elements, said driving element including a thermal element, a weight carried by said thermal element which by centrifugal force exerts normal pressure between said thermal element and driven element, said thermal element being expandible by heat, said thermal force and said centrifugal force simultaneously acting to produce normal engaging pressure during acceleration of said driven element, and said centrifugal force acting solely to produce normal engaging pressure when said driven element reaches a predetermined speed.

5. A friction clutch comprising in combination, a cylindrical rotating driving element and a cylindrical coaxially disposed driven element, engaging surfaces upon the respective elements, a bi-metal band carried by the driving element and constituting the engaging surface thereof, a weight carried by said bi-metal band whereby rotation of said driving element shifts said band into rubbing contact with the cooperating surface of the driven element, and heat generated by said rubbing causes the band to expand and increase the normal pressure of said engaging surface of the bi-metal band upon said surface of the driven element, said weight acting solely to produce the entire normal pressure when the driven element reaches a predetermined speed.

FREDERICK C. STANLEY.